June 8, 1954  F. D. COTTERMAN  2,680,251
SINK REFUSE RECEPTACLE OR THE LIKE
Filed Sept. 21, 1950
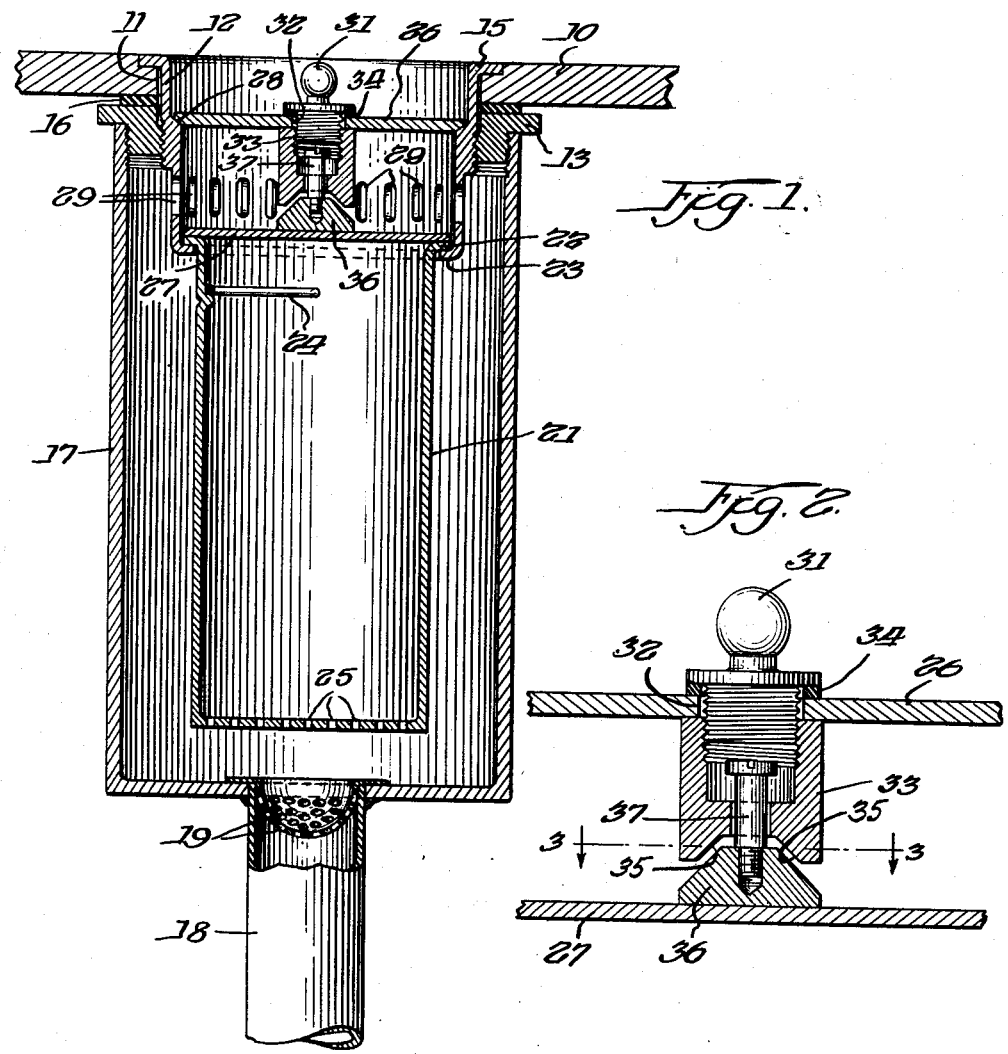
Inventor.
Frank D. Cotterman.
By Joseph O. Lange
Atty.

Patented June 8, 1954

2,680,251

UNITED STATES PATENT OFFICE 2,680,251

SINK REFUSE RECEPTACLE OR THE LIKE

Frank D. Cotterman, La Grange, Ill., assignor to Crane Co., Chicago, Ill., a corporation of Illinois Application September 21, 1950, Serial No. 186,093

6 Claims. (Cl. 4—292)

This invention pertains to a sink receptacle or the like, and, more particularly, to a combination sink drain cover and a receptacle cover separately operable over a refuse receptacle positioned in the waste outlet of a sink, lavatory or similar plumbing fixture.

It is an important object of this invention to provide a sink refuse receptacle providing the novel feature of a receptacle with a by-pass for water in combination with both a receptacle cover and a sink drain cover.

Another object of this invention is to provide a sink refuse receptacle located in the sink waste outlet or drain line and mountable therewithin on the usual sink drain openings. As will hereinafter become readily apparent, the entire construction is mounted in the sink drain to be positioned completely below the base level of the sink and, therefore, in no manner impeding the use of the sink.

Other objects and advantages will become more readily apparent upon proceeding with the following description read in light of the accompanying drawing, in which Fig. 1 is a sectional assembly view of a preferred embodiment of this invention.

Fig. 2 is an enlarged sectional view of the covers and actuating portion thereof relating to the structure shown in Fig. 1.

Fig. 3 is a sectional view of the cover engaging mechanism taken on the line 3—3 of Fig. 2.

Similar reference numerals refer to similar parts throughout the several views.

As shown in Fig. 1, this invention is preferably mounted within a drain outlet for a sink 10 having the usual opening 11 in the bottom thereof, and the remainder of the sink which is not shown should be understood as being of the conventional type. Also, the sink opening 11 may be the size of the usual drain opening existent in the normal sinks. Snugly located in the opening 11, and preferably depending therefrom, is a cylindrical spud member 12. The latter member may be provided with an upper annular outwardly flanged portion 15 to engage a corresponding recessed portion in the sink and support the receptacle structure which thus depends from the sink, as illustrated.

A substantially central outer portion of spud 12 is threaded for engagement with a threaded spud nut or joining ring 13 located substantially under the sink 10 to retain a gasket 16 therebetween and thereby form a fluid tight seal.

An outer portion of the ring 13 is preferably threaded to engage an upper inner surface of a depending cup-shaped member or outer casing 17. The lower central portion of the member 17 is open and suitably attached to a downwardly extending drain pipe 18 which leads to the usual trap and lends support to the entire receptacle structure. A strainer 19 may be provided in the lower opening of member 17 to thereby catch any excess refuse which may enter the strainer.

Spaced within the member 17 is an inner casing or refuse receptacle 21 which is preferably supported therewithin by the member 12. Thus, the support is provided by an upper outwardly flanged receptacle edge 22 annularly abutting a lower inwardly flanged edge 23 of the member 12. It should be apparent that the receptacle 21 could be supported within the member 17 in a number of other arrangements, such as a more direct attachment to the member 17. It is preferred that the receptacle 21 be provided with a plurality of apertures 25 in the bottom thereof for the purpose of refuse draining from within said receptacle.

A pivotally mounted receptacle handle 24 is attached to an accessible upper portion of the receptacle to facilitate removal of the latter from the member 17 when desired.

It should be understood that the receptacle member may be of an inexpensive material, such as a cardboard or composition container or a cloth bag, and thus be easily and relatively cheaply disposable.

An important feature of this invention resides in the construction of the member 12 and a drain closure cover 26 and a lower receptacle closure cover 27 which are normally disposed within the spud member 12. An inner annular portion of the member 12 is shouldered, as at 28, to form a seat for the drain cover 26. Thus, it will be apparent that liquid is prevented from passing from the sink basin when the cover 26 is placed in position on the annular seat surface 28. An annular wall portion of the member 12 below the seat 28 is provided with a plurality of apertures 29. It will be apparent that the last referred to lower portion of the member 12 could be entirely eliminated if the receptacle 21 had a more direct support from the member 17.

The receptacle cover 27 is normally seated upon the receptacle flanged end 22 to form a liquid seal with the receptacle.

As shown more clearly in Figs. 2 and 3, the respective upper and lower covers 26 and 27 are connected by means including a handle or actuating member 31 having a lower threaded portion extending through a central opening 32 in the cover 26. A lower hollow link member 33 is preferably internally threaded to engage with the lower threaded portion of the handle 31. The handle 31 may be provided with an annularly flanged portion above the threaded portion and thereby shoulder with the cover 26 to secure members 26, 31, and 33 together as shown. An annular gasket 34 is preferably disposed between the handle shoulder and the cover 26 to form a fluid seal therebetween.

The lower surface of the link member 33 has two oppositely inclined surfaces 35 for reasons hereinafter described in detail.

An upper portion of the cover 27 is provided with a fixed wedge shaped boss member 36 which aligns with the link member 33 to position the link surfaces 35 and the boss wedge surfaces normally in juxtaposed cooperative relation. A screw 37 is threaded into the boss 36 and the screw head extends upwardly into a central chamber formed in the link member 33 to be limitedly movable axially therewithin and thereby join the covers 26 and 27 with predetermined clearance or lost motion. Thus, it will now be clear that in the removal of cover 26, the cover 27 is also removed.

It should be noted that the normal respective seated positions of the covers 26 and 27 determines the space between them, which, of course, insures seating of the top cover 26 without being supported and held off the seat by link member 33 abutting boss 36.

The relation of the inclined and wedge surfaces on the members 33 and 36, respectively, thus exists for the desirable function of rotating the link member 33 through 90 degrees and thereby unseating the cover 26. In the above mentioned position, the link member 33 is supported on the uppermost surface of the boss 36 (see Fig. 3). The cover 27 remains seated on the receptacle 21.

It should, accordingly, be apparent that such described rotation of the handle 31 will permit the seating or unseating of the cover 26. The flow of water past the cover 26 may thus be controlled and permitted to pass through the apertures 29 flowing outside of and around the receptacle 21 and into the drain or waste outlet pipe 18. Since the cover 27 remains seated, no water will be allowed to pass into the receptacle 21, and only by removal of the structure with the covers 26 and 27, will the receptacle be open to receive water, garbage and similar sink refuse.

In summary, it will be clear that a comparatively simple, economical, and sanitary sink waste outlet with an easily disposable refuse container has been devised capable of being installed in new and old installations with a minimum of inconvenience and expense. It also possesses the advantage that, if desired, the container 21 may be suitably flushed by merely raising the cover 27 from its seat on the flanged portion 22 of the said receptacle upon suitable actuation of the handle 31.

Although this invention has been shown and described in but one specific form, it should not be so limited as it is susceptible to changes within the spirit of this invention and the scope of the appended claims.

I claim:

1. A combined sink receptacle and closure assembly comprising in combination a hollow spud member having an inwardly projecting annular shoulder, an inner casing removably mounted on the said spud member and having a lower drain therefrom, an outer casing mounted in leakproof relation to the sink and substantially enclosing the said spud member and the inner casing, a closure cover for said inner casing and a second closure cover for both said inner and outer casings, the latter named closure cover being axially movable to seat on the said annular shoulder of the spud member, an actuating mechanism for the said outer casing closure cover comprising a divided member having spaced-apart shouldered portions respectively supported by the said inner casing closure cover and the spud supported closure cover oppositely disposed whereby limited axial movement and subsequent rotation of the spud supported cover maintains a raised position for the said latter cover relative to the said inner casing cover without affecting the axial positioning of the said second cover.

2. A combined sink receptacle and closure assembly comprising in combination a hollow spud member having an inner annular shoulder, an inner casing removably mounted on the said spud member and having a lower drain, an outer casing with a lower discharge opening and mounted in leakproof relation to the sink to substantially enclose the said spud member and the inner casing, a closure cover for said inner casing and a second closure cover for both said inner and outer casings, the latter named closure cover being axially movable to seat on the said spud inner annular shoulder, an actuating mechanism for the said outer casing closure cover comprising spaced-apart relief portions on oppositely disposed lower and upper surfaces of said inner casing closure cover and the spud supported closure cover respectively whereby upon predetermined axial movement and subsequent rotation of the said spud supported cover lifting movement of the said latter cover is effected relative to the said inner casing cover, the said outer casing being imperforate except for that portion forming the discharge opening.

3. A combined sink receptacle and closure assembly comprising in combination a hollow spud member having an inner annular shoulder and an annular perforated wall portion, an inner casing removably depending from the said spud member and having a lower drain therefrom, an outer casing therefor in leakproof relation to the sink and substantially enclosing the said spud member and the inner casing, a closure cover at an upper end of the said inner casing and a second closure cover connected to the first cover and cooperating with the said spud member to close the said outer casing, the latter named closure cover being limitedly movable axially to seat on the spud inner annular shoulder, actuating means for the said outer casing closure cover comprising spaced-apart shouldered means between the said inner casing closure cover and the spud supported closure cover whereby limited axial movement and subsequent rotation of the spud supported cover maintains a lifted position of the said latter cover relative to the said inner casing cover, the perforated wall portion of the said spud member providing a flow passage between the said spud member and an annular chamber formed between the said inner and outer casings to allow fluid flow into the chamber when the first-named closure cover is limitedly lifted.

4. A combined sink receptacle and closure assembly comprising in combination a hollow spud member having an inner annular shoulder, an inner casing removably mounted on the said spud member and having a lower drain, an outer casing therefor in leakproof relation to the sink and substantially enclosing the said spud member and the inner casing, a closure cover for said inner casing and a second closure cover for both said inner and outer casings, the latter named closure cover being axially movable to seat on the said spud inner annular shoulder, the said closure covers having spaced apart relieved projections on oppositely disposed faces thereof whereby predetermined axial movement and subsequent rotation of the spud supported cover maintains the said latter cover in a lifted position relative to the said inner casing cover, the said closure covers having a loose connection therebetween cooperating with the said relieved projections to permit limited axial movement of one of said closure covers independently relative to the other cover.

5. A combined sink receptacle and closure assembly comprising in combination a hollow spud member having an inwardly projecting annular shoulder, an inner casing removably mounted on the said spud member and having a lower drain, an outer casing therefor mounted in leakproof relation to the sink and substantially enclosing the said spud member and the said inner casing, a removable closure cover for said inner casing and a second removable closure cover for both said inner and outer casings, the latter named closure cover being axially movable to seat on the said spud inwardly projecting annular shoulder, the said covers being loosely connected and including actuating means for the said outer casing closure cover comprising spaced-apart opposed projecting surfaces respectively on said inner casing closure cover and the outer casing closure cover whereby predetermined axial movement and subsequent rotation of the outer casing cover effects the unseating of the said latter cover relative to the said inner casing closure cover.

6. A combined sink receptacle and multiple closure cover assembly comprising in combination a hollow spud member with a perforated wall portion and having an inner annular shoulder, an inner casing removably mounted on the said spud member, an outer casing depending from said spud member and mounted in leakproof relation to the sink, the said outer casing substantially enclosing the said spud member and the inner casing, a closure cover at the upper portion of said inner casing and a second closure cover for both said inner and outer casings, the latter named closure cover being axially movable to seat predeterminately on the said spud inner annular shoulder, a substantially enclosed loose connection for the said covers and including actuating means for the said outer casing closure cover, the said latter means comprising normally spaced-apart shouldered portions oppositely disposed supported by the said inner casing closure cover and the spud supported closure cover respectively whereby predetermined lifting and subsequent rotation of the spud supported cover maintains said latter cover in increased spaced-apart position relative to the said inner casing cover.

References Cited in the file of this patent

UNITED STATES PATENTS

| Number | Name | Date |
|---|---|---|
| 1,083,990 | Collins | Jan. 13, 1914 |
| 1,111,886 | Duffy | Sept. 29, 1914 |
| 1,424,022 | LaCoste | July 25, 1922 |
| 1,612,588 | LaCoste | Dec. 28, 1926 |
| 1,630,351 | Mortimer | May 31, 1927 |
| 1,720,149 | Rom | July 9, 1929 |
| 2,079,038 | Ranish | May 4, 1937 |
| 2,163,453 | Schultis | June 20, 1939 |
| 2,225,693 | Francis | Dec. 24, 1940 |